April 18, 1950   J. DE LANAUZE   2,504,255
BEHIND-THE-LENS FILTER AND MASK ADAPTER
Filed Oct. 17, 1947
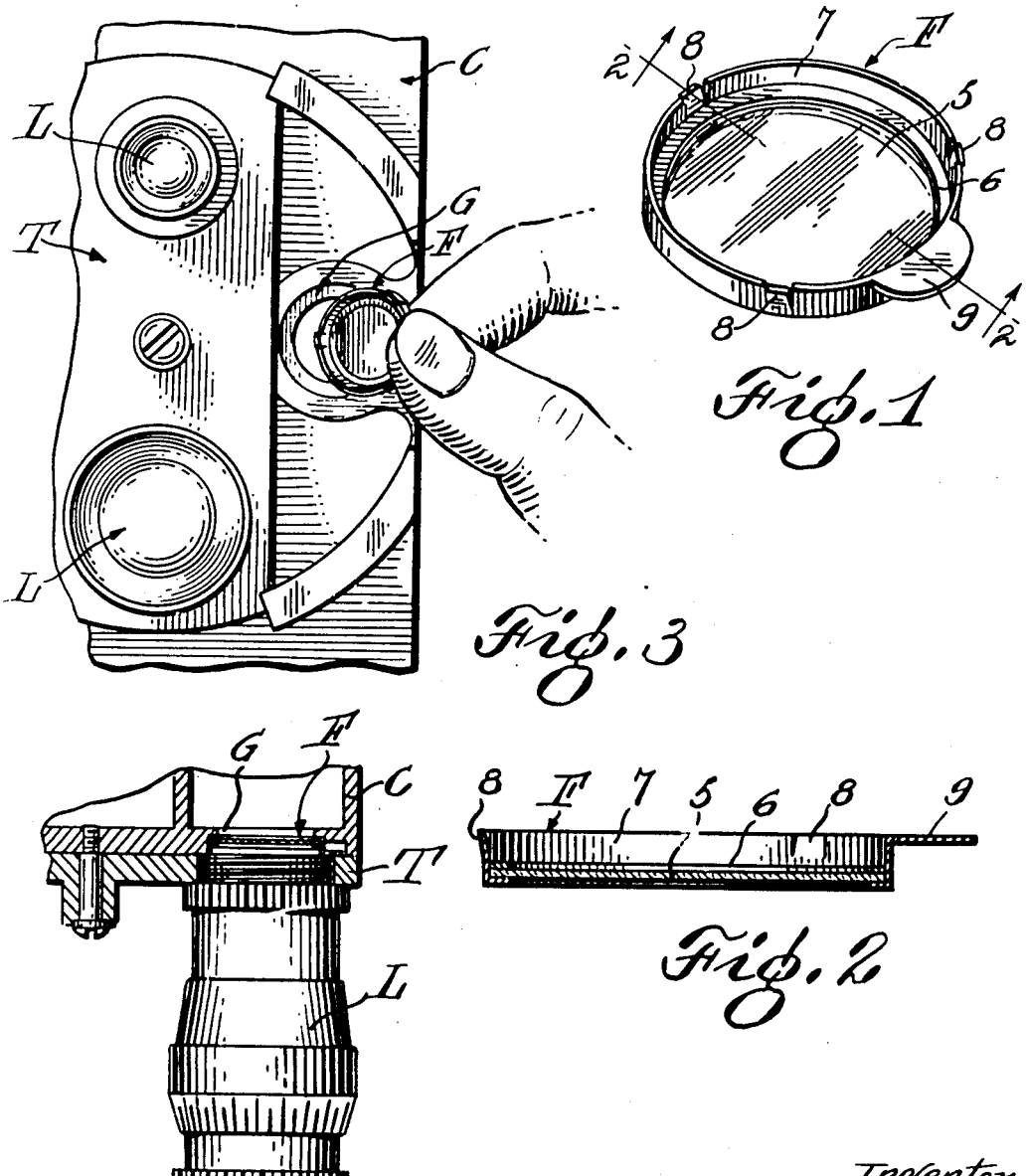
Inventor
Jacques de Lanauze
By
Attorneys Patented Apr. 18, 1950

2,504,255

UNITED STATES PATENT OFFICE 2,504,255

BEHIND-THE-LENS FILTER AND MASK ADAPTER

Jacques de Lanauze, Montreal, Quebec, Canada

Application October 17, 1947, Serial No. 780,389

3 Claims. (Cl. 95—81.5)

1

The present invention relates to a filter for cameras, and, more particularly, a filter for use with turret cameras and adapted to be fitted behind the lens thereof.

In present day photography, filters have become necessary units of equipment to the cameraman who carries out his work under widely varying light conditions. In fact, experience has shown photographers the desirability of carrying with them a set of filters capable of equalizing the different colours of light which it might be expected to encounter.

This problem is further complicated, in motion picture photography, by the use of turret cameras, in which several lenses each appropriate for a different type of work may be mounted on a rotatable turret, whereupon the lens desired for any type of work may be quickly brought into position in front of the camera gate. In using such cameras in the past, therefore, it has often been found necessary to carry three sets of filters or more, one set for each lens provided. This unnecessary multiplication of the number of filters required is what the present invention contemplates avoiding, and this without any decrease in the efficiency of the camera.

The method by which the present invention plans to circumvent the above difficulties, is by providing a filter set in an appropriate holder which may be fitted directly into the gate of the camera underneath the base plate of the turret. By disposing an appropriate filter in such a position, it will serve adequately for any of the lenses disposed upon the turret, and only a single set of filters will be necessary. Moreover, a suitably designed filter so disposed will not alter the focusing characteristics of the camera lens.

The main object, then, of the present invention is to provide a filter and a suitable holder therefor, which may be fitted directly in the gate of a turret camera.

Another important object resides in the provision of a camera filter of the character described which is easily and quickly insertible in or removable from the gate of a camera.

And another object resides in the provision of a camera filter of the character described which will not alter the focusing characteristics of the camera.

Other objects and advantages will become apparent, or be further pointed out, in the description to follow.

As an example, and for purposes of illustration only, a preferred embodiment of my invention is shown in the annexed drawing, wherein:

Figure 1 shows a perspective view of the filter and holder;

Figure 2 shows a section along the line 2—2 of Figure 1;

Figure 3 shows an elevation view of a filter according to the invention in the process of being fitted into the gate of a camera; and Figure 4 shows a fragmentary sectional plan of the filter according to the invention fitted into the gate of a camera.

Referring now to the drawing, wherein the same reference characters denote corresponding parts throughout, the filter according to the invention is indicated generally by F and will be fitted into the gate G of a camera C, the latter having a rotatable turret of which T is the base plate upon which are disposed suitable lenses L.

It is assumed that the gate G is generally circular in shape, and is depressed somewhat from the front face of the camera, or behind the plate T of the turret. It is into this depression therefore, that the filter of the invention is designed to fit.

The filter is therefore preferably circular in shape and of somewhat smaller diameter than the frame of the gate of the camera. In accordance with the invention, the filter proper will consist of a thin film or window of gelatin or the like, such material being preferably used owing to its extremely low defractive properties, thus eliminating any possibility of changing the focusing characteristics of the camera. The holder of the filter will also be circular in shape consisting of two circumferential rims 6, between which the gelatin film 5 is fitted, and the flange 7 directed at right angles to the plane of the film around the perimeter thereof and integral with the rims.

The outside diameter of flange 7 will be such that this flange will fit comfortably into the depression formed by the gate G of the camera. When thus fitted into the camera, the gelatin film retained by the rim 6 will be disposed across the gate of the camera.

In order that the flange may be held more securely in the gate of the camera, suitable projections may be provided in the outside surface thereof so that, even with a loose strip between flange and gate edges, the filter will be held securely. Thus in Figure 1, the flange is shown formed with three, angularly disposed, cut-out projections 8 in the outer surface thereof. Examining the left extremity of Figure 2, it is seen that these projections 8 curve outwardly from the surface of the flange, and, being resilient, will take up any slack between filter and gate.

As an additional feature to the invention, a suitably shaped thumb-tab 9 is provided on the flange projecting parallel to the plane of the filter from a portion of the outer edge of the circumference thereof. By means of this tab, the filter may be easily and quickly inserted into place in the gate of a camera, and, when desired, snicked out with the fingernail or the like.

Figure 4 shows the filter disposed in place in the gate of a camera with the base plate of the turret and a lens carried thereby rotated into place in operative position.

It will be clear that, in place of a light filtering and transmitting film, a film adapted to pass light in various patterns might be fitted in the holder, and hence serve as a mask. Thus a substantially opaque film having a transparent portion simulating a keyhole, for instance, might be fitted to the holder, and any resultant pictures would appear to have been taken through a keyhole. Any other desired pattern might be employed and a corresponding effect obtained.

Obviously from the foregoing, the present invention fulfills the objectives hereinbefore set forth. A set of filters so constructed may be easily and quickly inserted into place or removed from the gate of the camera, and will serve adequately for any of the lenses brought into place in front thereof. Moreover, the provision of the projecting portion 8 of the flange and the tab 9 insure that a snug fit will be preserved in the gate of the camera, and that the filter will not become stuck in place.

It will be understood that I do not limit myself to any particular shape or size of parts component in this invention but rather that various changes therein may be made without departing from the spirit of the invention or the scope of the subjoined claims.

Having thus described my invention, I claim:

1. The combination with a camera having a lens gate and a turret lens mount, of a filter engageable in said gate, said filter comprising a band of suitable dimensions to be fitted in said gate, a light-modifying film adapted to transmit light fitted across said band, struck projections on said band adapted to hold the latter in the gate by frictional engagement and a tab projecting from said band to aid in releasing the latter from the gate.

2. A filter for cameras having a lens gate, comprising a circular band adapted to be removably fitted in said gate, interior rims around said band, a film of light-transmitting material secured across said band between said rims, more than one segment of the perimeter of said band bent outwardly therefrom for the purpose of frictionally engaging said gate, and a tab projecting from a portion of one edge of the perimeter of the band to aid in the removing thereof from the gate.

3. As an article of manufacture, a behind-the-lens filter for cameras having a lens turret and gate, said filter comprising a circular band adapted to fit in said gate, a film of light-transmitting and modifying material fitted across said band, projections on said band comprising more than one portion of the perimeter of the band separated from the rest thereof and bent outwardly therefrom; whereby said projections are adapted to hold the filter in the gate by frictional engagement with the latter, and a tab projecting from an edge of the perimeter of the band to aid in the releasing thereof from engagement with the gate.

JACQUES DE LANAUZE.

REFERENCES CITED

The following references are of record in the file of this patent:

UNITED STATES PATENTS

| Number | Name | Date |
| --- | --- | --- |
| 2,182,585 | Green | Dec. 5, 1939 |

FOREIGN PATENTS

| Number | Country | Date |
| --- | --- | --- |
| 234,474 | Great Britain | Aug. 16, 1925 |